(12) United States Patent
Chen et al.

(10) Patent No.: US 11,855,489 B2
(45) Date of Patent: Dec. 26, 2023

(54) ROTOR ASSEMBLY AND CONSEQUENT-POLE MOTOR

(71) Applicant: Gree Electric Appliances, Inc. of Zhuhai, Guangdong (CN)

(72) Inventors: Bin Chen, Guangdong (CN); Quanfeng Li, Guangdong (CN); Yong Xiao, Guangdong (CN); Jinfei Shi, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 562 days.

(21) Appl. No.: 17/055,881

(22) PCT Filed: Dec. 18, 2018

(86) PCT No.: PCT/CN2018/121701
§ 371 (c)(1),
(2) Date: Nov. 16, 2020

(87) PCT Pub. No.: WO2020/034514
PCT Pub. Date: Feb. 20, 2020

(65) Prior Publication Data
US 2021/0226492 A1    Jul. 22, 2021

(30) Foreign Application Priority Data
Aug. 13, 2018 (CN) .......... 201810918419.3

(51) Int. Cl.
*H02K 1/27* (2022.01)
*H02K 1/276* (2022.01)

(52) U.S. Cl.
CPC ....... *H02K 1/2766* (2013.01); *H02K 2213/03* (2013.01)

(58) Field of Classification Search
CPC . H02K 1/2746; H02K 1/2766; H02K 2213/03
(Continued)

(56) References Cited

U.S. PATENT DOCUMENTS 6,008,559 A *  12/1999  Asano ............... H02K 1/276
                                          310/216.073
6,218,753 B1 *  4/2001  Asano ............... H02K 1/276
                                          310/156.53
(Continued)

FOREIGN PATENT DOCUMENTS

CN       103117611 A     5/2013
CN       203219035 U     9/2013
(Continued)

*Primary Examiner* — Alex W Mok
(74) *Attorney, Agent, or Firm* — The Webb Law Firm (57) ABSTRACT

The present disclosure relates to a rotor assembly and a consequent-pole motor, and the rotor assembly includes an iron core and a plurality of permanent magnets. The iron core is provided with a plurality of mounting grooves for accommodating permanent magnets distributed along a circumferential direction of the iron core. One side of each of the mounting grooves adjacent to an end of an outer edge of the iron core is provided with a second air slot which is located in a consequent-pole region. The second air slot is communicated with the mounting groove. The second air slot can, on one hand, prevent magnetic lines emitted from the permanent magnet from short-circuiting through an end of the permanent magnet, so as to decrease the magnetic flux leakage, and on the other hand, adjust an orientation of the magnetic lines in the consequent-pole region, so as to weaken torque fluctuation.

18 Claims, 4 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 7,786,641 B2 * | 8/2010 | Nishijima .............. | H02K 1/276 |
| | | | 310/156.56 |
| 7,902,712 B2 * | 3/2011 | Nakamasu ............. | H02K 16/04 |
| | | | 310/156.56 |
| 2004/0007930 A1 | 1/2004 | Asai et al. | |
| 2011/0241468 A1 * | 10/2011 | Inagaki ................ | H02K 1/2766 |
| | | | 310/156.32 |
| 2012/0256508 A1 * | 10/2012 | Suzuki ................. | H02K 1/2766 |
| | | | 310/156.38 |
| 2014/0217849 A1 * | 8/2014 | Soma ................... | H02K 1/2766 |
| | | | 310/156.53 |
| 2016/0285330 A1 * | 9/2016 | Mukai .................. | F25B 31/026 |

FOREIGN PATENT DOCUMENTS

| | | |
|---|---|---|
| CN | 103872819 A | 6/2014 |
| CN | 103986259 A | 8/2014 |
| CN | 104659938 A | 5/2015 |
| CN | 107124055 A | 9/2017 |
| CN | 107196434 A | 9/2017 |
| CN | 107591921 A | 1/2018 |
| CN | 108023419 A | 5/2018 |
| CN | 108768023 A | 11/2018 |
| CN | 108832742 A | 11/2018 |
| CN | 208508641 U | 2/2019 |
| JP | 2004254396 A | 9/2004 |
| JP | 2006311772 A | 11/2006 |
| JP | 2012120413 A | 6/2012 |
| WO | 2014117575 A1 | 8/2014 |

* cited by examiner

ROTOR ASSEMBLY AND CONSEQUENT-POLE MOTOR

CROSS-REFERENCE TO RELATED APPLICATIONS

This application is the United States national phase of International Application No. PCT/CN2018/121701 filed Dec. 18, 2018, and claims priority to Chinese Patent Application No. 201810918419.3 filed Aug. 13, 2018, the disclosures of which are hereby incorporated by reference in their entirety.

BACKGROUND OF THE INVENTION

Field of the Invention

The present disclosure relates to the technical field of motors, and particularly, to a rotor assembly and a consequent-pole motor.

Description of Related Art

As compared with the traditional permanent magnet synchronous motor, the consequent-pole permanent magnet synchronous motor makes fuller use of the permanent magnets. The number of permanent magnets used in the consequent-pole permanent magnet synchronous motor is only a half of the number of permanent magnets in the traditional permanent magnet synchronous motor, which significantly decreases the number of permanent magnets used in the motor, thereby reducing the cost of the motor. However, the consequent-pole permanent magnet synchronous motor in the related art has a large torque fluctuation, which limits the further popularization and application of the consequent-pole permanent magnet synchronous motor.

SUMMARY OF THE INVENTION

In view of this, the embodiments of the present disclosure provide a rotor assembly that stably outputs a torque and a consequent-pole motor, which can solve the problem of a large torque fluctuation in a consequent-pole permanent magnet synchronous motor in the related art.

In one aspect of the present disclosure, a rotor assembly is provided. The rotor assembly, includes:
    an iron core provided with a plurality of mounting grooves; and
    a plurality of permanent magnets accommodated respectively in the plurality of mounting grooves,
    wherein the plurality of mounting grooves are distributed along a circumferential direction of the iron core, and divide the iron core into a plurality of permanent magnetic pole regions and a plurality of consequent-pole regions, each mounting groove of the mounting grooves has a first end adjacent to an outer edge of the iron core; one side of the first end is provided with a second air slot located in the consequent-pole regions; the second air slot is communicated with the mounting groove, and magnetic poles of the plurality of permanent magnets facing the outer edge of the iron core are the same.

In some embodiments, the other side of the first end is provided with a first air slot located in the permanent magnetic pole regions, and the first air slot is disposed to be spaced apart from the mounting groove.

In some embodiments, a circumferential width dimension of the first air slot gradually increases along a radially outward direction of the iron core.

In one aspect of the present disclosure, a rotor assembly is provided. The rotor assembly includes:
    an iron core provided with a plurality of mounting grooves which are distributed along a circumferential direction of the iron core, and divide the iron core into a plurality of permanent magnetic pole regions and a plurality of consequent-pole regions, each mounting groove of the mounting grooves has a first end adjacent to an outer edge of the iron core; two sides of the first end are provided with one first air slot located in the permanent magnetic pole regions and one second air slot located in the consequent-pole regions, respectively; the first air slot is disposed to be spaced apart from the mounting groove, and a circumferential width dimension of the first air slot gradually increases along a radially outward direction of the iron core; the second air slot is communicated with the mounting groove; and
    a plurality of permanent magnets accommodated respectively in the plurality of mounting grooves, and magnetic poles of the plurality of permanent magnets facing the outer edge of the iron core are the same.

In some embodiments, the second air slot is extended along the circumferential direction of the iron core, and one side of the second air slot adjacent to an axis of the iron core is stepped; a dimension of the second air slot along a radial direction of the iron core is defined as a radial width of the second air slot, the second air slot sequentially comprises a first stepped groove and a second stepped groove along a direction away from the first end, and a radial width of the first stepped groove is less than a radial width of the second stepped groove.

In some embodiments, a radius of the iron core is R, the radial width of the first stepped groove is w1, and the radial width of the second stepped groove is w2; the radius R of the iron core, the radial width w1 of the first stepped groove and the radial width w2 of the second stepped groove satisfy the following relationships: w2<0.17R, and w2/w1=1.4 to 1.8.

In some embodiments, the plurality of the permanent magnetic pole regions and the plurality of the consequent-pole regions are distributed at intervals along the circumferential direction of the iron core; central angles respectively corresponding to the plurality of permanent magnetic pole regions are equal to each other, and central angles respectively corresponding to the plurality of consequent-pole regions are equal to each other.

In some embodiments, the number of the permanent magnetic pole regions and the number of the consequent-pole regions are N; in two of the second air slots in one of the consequent-pole regions, a central angle formed by two end faces of two second stepped grooves away from respective corresponding mounting grooves is a1, which satisfies: a1/(180°/N)=0.5 to 0.65.

In some embodiments, in two second air slots in one of the consequent-pole regions, a central angle formed by two end faces of two second stepped grooves away from respective corresponding mounting grooves is a1, and a central angle formed by two end faces of the two second stepped grooves adjacent to respective corresponding mounting grooves is a2, and a1 and a2 satisfy: a2/a1=1.5 to 1.9.

In some embodiments, the permanent magnet is a rare earth permanent magnet; a radius of the iron core is R; in two first air slots in one of the permanent magnetic poles, a central angle formed by two end faces of two of the first air slots away from respective corresponding mounting grooves is a4; a dimension of the first air slot along a radial direction of the iron core is defined as a radial width of the first air slot, which is w4; each mounting groove of the mounting grooves has a second end adjacent to a center of the iron core, and a dimension pointing from the second end to the first end of the mounting groove is defined as a width of the mounting groove, which is w3; R, a4, w4 and w3 satisfy: $2*(w3-w4)*0.8/(2*\pi*a4*R/360°)=1.6$ to 1.9.

In some embodiments, the permanent magnet is a ferrite permanent magnet; a radius of the iron core is R; in two first air slots in one of the permanent magnetic poles, a central angle formed by two end faces of the two first air slots away from respective corresponding mounting grooves is a4; a dimension of the first air slot along a radial direction of the iron core is defined as a radial width of the first air slot, which is w4; each mounting groove of the mounting grooves has a second end adjacent to a center of the iron core, and a dimension pointing from the second end to the first end of the mounting groove is defined as a width of the mounting groove, which is w3; and R, a4, w4 and w3 satisfy: $2*(w3-w4)*0.3/(2*\pi*a4*R/360°)=1.6$ to 1.9.

In some embodiments, every two of the mounting grooves form a mounting groove group which is V-shaped, with an opening thereof facing the outer edge of the iron core, and two mounting grooves in each of the mounting groove groups are disposed symmetrically with respect to a radial direction of the iron core; the plurality of mounting groove groups are uniformly distributed along the circumferential direction of the iron core; a region within a V-shaped included angle of the mounting groove group is a permanent magnetic pole region, and a region between the adjacent mounting groove groups is a consequent-pole region.

In some embodiments, the permanent magnetic pole region is provided with two first air slots which are adjacent to first ends of the two mounting grooves in the mounting groove group, respectively, and which are symmetrical with respect to a center line of a V-shape of the mounting groove group; and two second air slots respectively corresponding to the first ends of two mounting grooves in the mounting groove group are symmetrical with respect to the center line of the V-shape of the mounting groove group.

In some embodiments, a center of the iron core is provided with a rotation shaft hole; the iron core is further provided with a third air slot annularly arranged on an outer edge of the rotation shaft hole; the third air slot is a structure composed of a plurality of segments, each segment of the third air slot (170) is interposed between two of the mounting grooves, and an end face of the third air slot is disposed to be spaced apart from the mounting grooves.

In some embodiments, each mounting groove of the mounting grooves has a second end adjacent to the center of the iron core, and a dimension pointing from the second end to the first end of the mounting groove is defined as a width of the mounting groove; a dimension of the third air slot along a radial direction of the iron core is defined as a radial width of the third air slot; the width of the mounting groove is w3, the radial width of the third air slot is t2, and w3 and t2 satisfy: $t2/w3=0.1$ to 0.3.

In some embodiments, a dimension of the third air slot along a radial direction of the iron core is defined as a radial width of the third air slot, which is t2; a distance between a sidewall of the rotation shaft hole and a sidewall of the third air slot adjacent to the rotation shaft hole is t3, and t2 and t3 satisfy: $t3 \geq 2*t2$.

In some embodiments, a dimension of the third air slot along a radial direction of the iron core is defined as a radial width of the third air slot, which is t2; a distance between an end face of the third air slot and a side wall of the mounting groove adjacent to the third air slot is tb1, and t2 and tb1 satisfy: $tb1/t2=0.3$ to 1.

In some embodiments, an included angle between an end face of the second stepped groove adjacent to the mounting groove and a side adjacent to an axis of the iron core is a3, which satisfies: $a3=85°$ to $110°$.

In some embodiments, a dimension of the first air slot along a radial direction of the iron core is defined as a radial width of the first air slot; a radial width of the first air slot is w4, and a distance between the first air slot and the mounting groove is tb2, and w4 and tb2 satisfy: $tb2/w4=0.3$ to 0.5.

In one aspect of the present disclosure, a consequent-pole motor is provided. The consequent-pole motor includes a rotor assembly according to any one of the above solutions, and a stator assembly disposed to sleeve an outer edge of the rotor assembly.

Therefore, according to the embodiments of the present disclosure, in the rotor assembly and the consequent-pole motor, the second air slot can, on one hand, prevent magnetic lines emitted from the permanent magnet from short-circuiting through an end of the permanent magnet, so as to decrease the magnetic flux leakage, and on the other hand, adjust an orientation of the magnetic lines in the consequent-pole region, so as to weaken the torque fluctuation. In other embodiments, the first air slot adjusts the width of the permanent magnet facing the air gap, while limiting the magnetic flux leakages at both ends of the permanent magnet. Studies have shown that an iron loss can be significantly decreased by a characteristic that the width gradually increases in a direction along the permanent magnet and toward an outer periphery of a rotor. The first air slot is disposed to be spaced apart from the mounting groove, which can allow more magnetic lines of the permanent magnet to enter the air gap and further improve a utilization ratio of the permanent magnet.

BRIEF DESCRIPTION OF THE DRAWINGS

The accompanying drawings that form a part of the specification describe the embodiments of the disclosure and, together with the description, serve to explain the principle of the present disclosure. The present disclosure can be more clearly understood from the following detailed description with reference to the accompanying drawings, in which.

DETAILED DESCRIPTION OF THE INVENTION

In order that the objectives, technical solutions and advantages of the present disclosure are clearer, a rotor assembly and a consequent-pole motor of the present disclosure will be further described in detail through the embodiments with reference to the accompanying drawings.

It should be noted that when an element is referred to be "fixed" to another element, it may be directly on the another element or there may be an intermediate element. When an element is considered to be "connected" to another element, it may be directly connected to the another element or there may be an intermediate element at the same time. On the contrary, when an element is referred to be "directly on" another element, there is no intermediate element. As used herein, terms "vertical", "horizontal", "left", "right" and similar expressions are for an illustrative purpose only. Various objects in the accompanying drawings for the embodiments are drawn at a scale convenient for illustration, rather than at a scale of actual components.

The number of permanent magnets used by the consequent-pole motor is only half of the number of permanent magnets of the traditional permanent magnet synchronous motor, which makes a fuller use of the permanent magnets and can significantly decrease the number of permanent magnets used, thereby reducing the cost of the motor. However, its special magnetic circuit structure also brings about many problems, including the reduction of the output torque caused by the decrease of the number of permanent magnets used and the increase of the torque fluctuation caused by the asymmetry of adjacent magnetic pole structures, which limits the further popularization and application of the consequent-pole motor. The present disclosure provides a rotor assembly and a consequent-pole motor, which have a large output torque and can significantly decrease the torque fluctuation.

Figure 1:
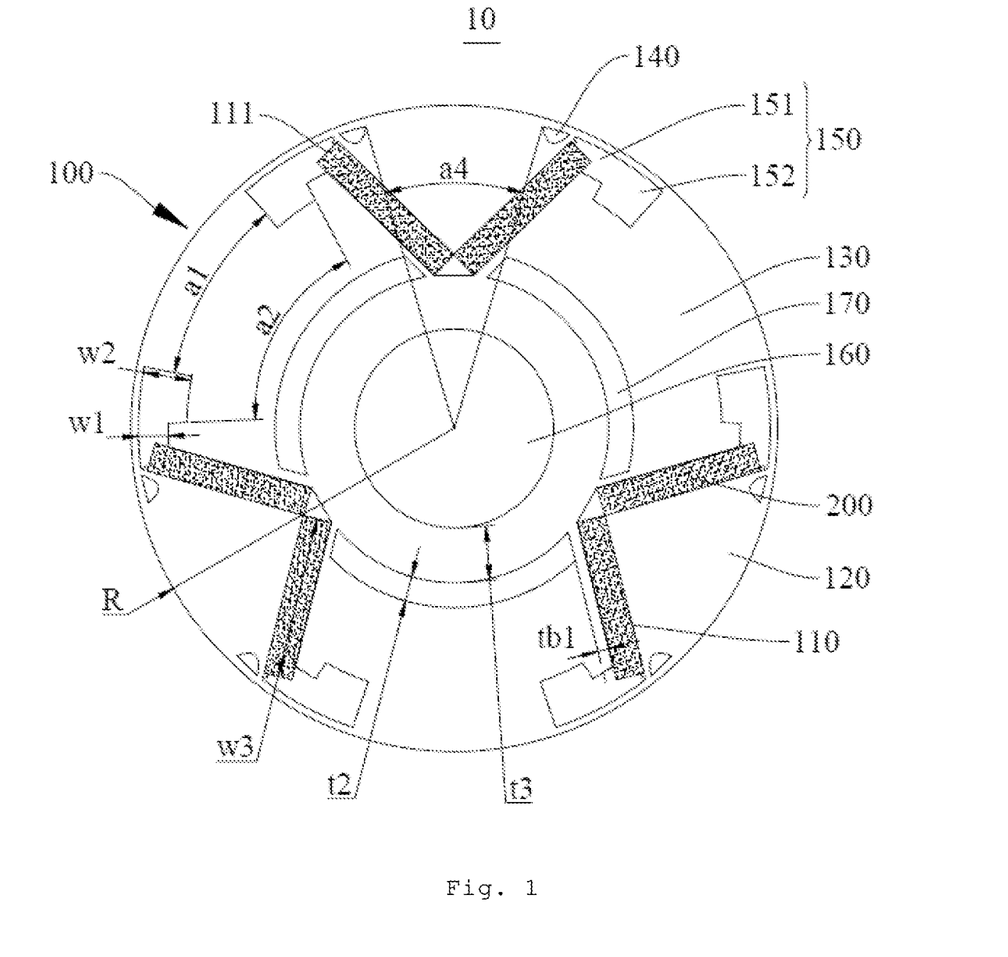
FIG. 1 is a structural schematic diagram of some embodiments of a rotor assembly of the present disclosure.
Figure 2:
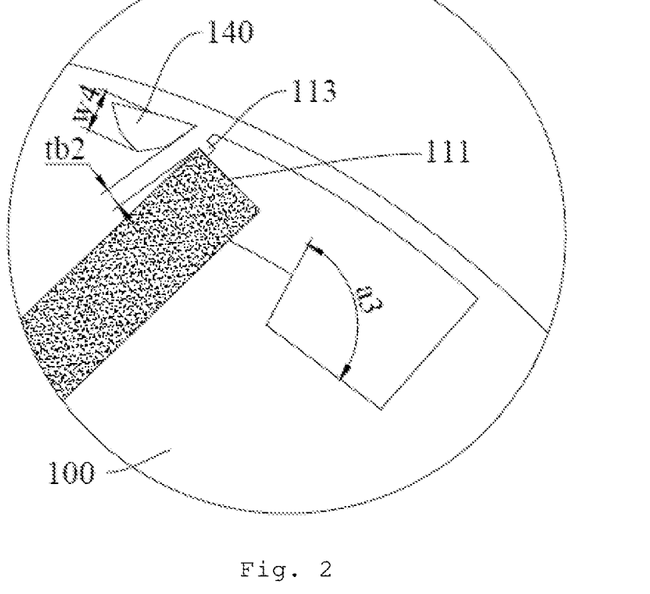
FIG. 2 is an enlarged schematic diagram of a structure adjacent to a first end of a mounting groove in the embodiments of FIG. 1.

As illustrated in FIGS. 1 to 2, some embodiments of the present disclosure provide a rotor assembly 10, including an iron core 100 and a plurality of permanent magnets 200. The iron core 100 is provided with a plurality of mounting grooves 110, which are distributed along a circumferential direction of the iron core 100 and divide the iron core 100 into a plurality of permanent magnetic pole regions 120 and a plurality of consequent-pole regions 130. Each mounting groove 110 of the mounting grooves 110 has a first end 111 adjacent to an outer edge of the iron core 100. Two sides of the first end 111 are provided with one first air slot 140 located in the permanent magnetic pole regions 120, and one second air slot 150 located in the consequent-pole regions 130, respectively. The first air slot 140 is disposed to be spaced apart from the mounting groove 110, and a circumferential width dimension of the first air slot 140 gradually increases along a radially outward direction of the iron core 100. The second air slot 150 is communicated with the mounting groove 110. The plurality of permanent magnets 200 are accommodated respectively in the plurality of mounting grooves 110, and magnetic poles of the plurality of permanent magnets 200 facing the outer edge of the iron core 100 are the same.

In the rotor assembly 10 and the consequent-pole motor described above, the first air slot 140 adjusts a width of the permanent magnetic pole region 120 facing an air gap, while limiting magnetic flux leakages at both ends of the permanent magnet 200. Studies have shown that an iron loss can be significantly decreased by a characteristic that the width gradually increases in a direction along the permanent magnet 200 and toward an outer periphery of a rotor. The first air slot 140 is disposed to be spaced apart from the mounting groove 110, which can allow more magnetic lines of the permanent magnet 200 to enter the air gap and further improve a utilization ratio of the permanent magnet 200. The second air slot 150 can, on the one hand, prevent the magnetic lines emitted from the permanent magnet 200 from short-circuiting through an end of the permanent magnet 200, so as to decrease the magnetic flux leakage, and on the other hand, adjust an orientation of the magnetic lines on the consequent-pole region 130, so as to weaken the torque fluctuation.

As an implementable way, the iron core 100 in the above embodiment is formed by laminating sheets of a soft magnetic material. The number and layout of the mounting grooves 110 may be designed to be in a line, a V-shape, an arc-shape or any other shape according to actual working conditions. As illustrated in FIGS. 1 and 2, in some embodiments of the present disclosure, the iron core 100 is a cylinder as a whole, and the mounting groove 110 is a rectangular groove as a whole. In a plane perpendicular to an axial direction of the iron core 100, every two of the mounting grooves 110 form a mounting groove group. The mounting groove group is V-shaped, with an opening thereof facing the outer edge of the iron core 100, and two of the mounting grooves 110 in each of the mounting groove groups are disposed symmetrically with respect to a radial direction of the iron core 100. A plurality of mounting groove groups are uniformly distributed along a circumferential direction of the iron core 100. The first end 111 of each of the mounting grooves 110 has a protrusion 113, which can be abutted against the permanent magnet 200 put into the mounting groove 110, and which cooperates with an inner wall of the mounting groove 110 to fix the permanent magnet 200.

Further, as illustrated in FIGS. 1 and 2, two opposite sides of the two permanent magnets 200 mounted in one mounting groove group simultaneously face the outer edge of the iron core 100. Each of the permanent magnets 200 facing the outer edge of the iron core 100 has a same polarity, i.e., an N pole or an S pole. A region within a V-shaped included angle of the mounting groove group is the permanent magnetic pole region 120, and it is opposite to a side of the permanent magnet 200 facing the outer edge of the iron core 100. The soft magnetic material between the adjacent mounting groove groups is magnetized into a consequent-pole region 130 having a polarity opposite to that of the permanent magnetic pole. Further, the plurality of permanent magnetic pole regions 120 and the plurality of consequent-pole regions 130 are distributed at intervals along the circumferential direction of the iron core 100. Central angles respectively corresponding to the plurality of permanent magnetic pole regions 120 are equal to each other, and central angles respectively corresponding to the plurality of consequent-pole regions 130 are equal to each other.

The first air slot 140 located in the permanent magnetic pole region 120 reasonably adjusts the width of the permanent magnetic pole region 120 facing the air gap. If the width is large, a large air gap magnetic density cannot be formed; and if the width is small, many magnetic lines will be concentrated together, resulting in a magnetic saturation which causes an increase of the iron loss of the rotor, an increase of the heat productivity and a decrease of the electromagnetic torque. In addition, the first air slot 140 limits the magnetic flux leakages at both ends of the permanent magnet 200. As an implementable way, as illustrated in FIGS. 1 and 2, the first air slot 140 has a hemispherical or polygonal shape so as to gradually increase the dimension of the first air slot 140 along the circumferential direction of the iron core 100, and the first air slot 140 can smooth the magnetic lines nearby and decease the iron loss. Further, the permanent magnetic pole region 120 is provided with two first air slots 140 which are adjacent to the first ends 111 of two mounting grooves 110 in one mounting groove group, respectively, and are symmetrical with respect to a center line of the V-shape of corresponding mounting groove group. The symmetrical first air slots 140 further decrease the fluctuation of the output torque.

In some embodiments of the present disclosure, as illustrated in FIGS. 1 to 2, the second air slot 150 is extended along the circumferential direction of the iron core 100, and one side of the second air slot 150 adjacent to an axis of the iron core 100 is stepped. A dimension of the second air slot 150 along the radial direction of the iron core 100 is defined as a radial width of the second air slot 150. The second air slot 150 sequentially includes a first stepped groove 151 and a second stepped groove 152 along a direction away from the first end 111. A radial width of the first stepped groove 151 is less than a radial width of the second stepped groove 152. The second air slot 150 can, on one hand, prevent increase of the magnetic flux leakage caused by short-circuiting of the magnetic lines emitted from the permanent magnet 200 through an end of the permanent magnet 200, and on the other hand, adjust an orientation of the magnetic lines in the consequent-pole region 130, so as to weaken the torque fluctuation. By setting the second air slot 150 to be extended in a step shape, the orientation of the magnetic lines in the consequent-pole region 130 can be effectively adjusted without influencing the magnetic circuit of the permanent magnetic pole region 120. As an implementable way, two second air slots 150 respectively corresponding to the first ends 111 of two mounting grooves 110 in one mounting groove group are symmetrical with respect to a center line of the V-shape of the corresponding mounting groove group.

Studies have shown that by setting the second air slot 150 to be extended in a step shape, the magnetic lines generated on a side of the permanent magnet 200 facing the consequent-pole region 130 will reach the consequent-pole region 130 along the second air slot 150. In some embodiments of the present disclosure, a radius of the iron core 100 is R, a radial width of the first stepped groove 151 is w1, and a radial width of the second stepped groove 152 is w2. The radius R of the iron core 100, the radial width w1 of the first stepped groove 151 and the radial width w2 of the second stepped groove 152 satisfy the following relationships: w2<0.17R, and w2/w1=1.4 to 1.8. It can be understood that if w2 is too large, an area of the consequent-pole region 130 remained for a passage of the magnetic lines decreases as the second air slot 150 is more adjacent to the center of the iron core 100, and an inverted splayed-shape will be formed. The magnetic lines emitted from adjacent permanent magnets 200 are converged at an included angle of the inverted splayed-shape, which causes a saturation of the magnetic density and a decrease of the output torque of the rotor. If w2 is too small, the magnetic lines emitted from the permanent magnet 200 will directly pass through the second air slot 150, which disenables the second air slot 150 to effectively adjust the shape of the magnetic lines entering the air gap, thereby aggravating the asymmetry of adjacent magnetic poles and causing a greater torque fluctuation.

Figure 3:
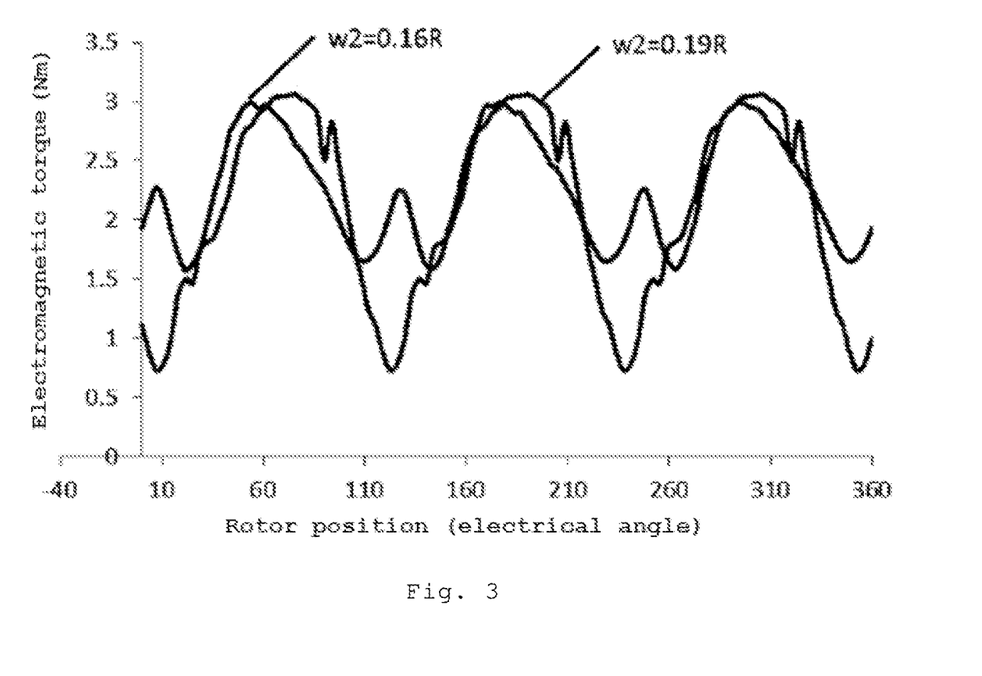
FIG. 3 is a graph illustrating an influence on a torque curve by a width change of a second stepped groove in a radial direction in some embodiments of a rotor assembly of the present disclosure.
Figure 4:
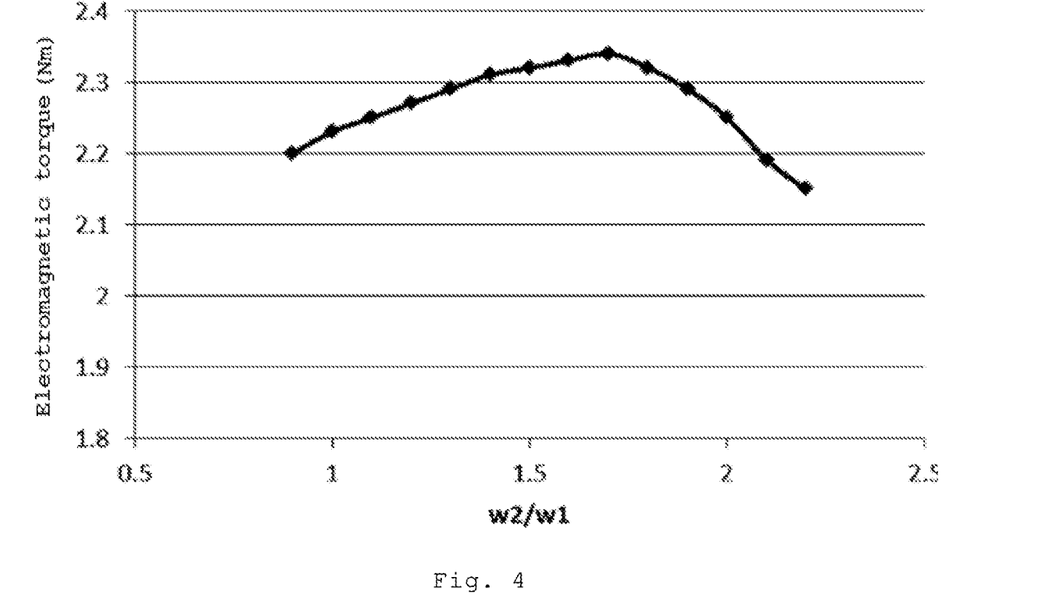
FIG. 4 is a graph illustrating a change of an electromagnetic torque along with w2/w1 in some embodiments of a rotor assembly of the present disclosure.

The value of w1 is set to be less than that of w2, because if w1 is too large, a side of the permanent magnet 200 facing the consequent-pole region will be excessively shielded by the second air slot 150. Since the permeability of air is very small, the magnetic lines of the permanent magnet 200 cannot reach the consequent-pole, thereby decreasing the electromagnetic torque. If w1 is too small, the magnetic lines emitted from the permanent magnet 200 will directly pass through the second air slot 150 to cause a short-circuit, which increases the magnetic flux leakages at the ends of the permanent magnet 200 and also decreases the output torque. By correlating w1 and w2 to satisfy: w2<0.17R and w2/w1=1.4 to 1.8, the orientation of the magnetic lines in the consequent-pole region 130 can be effectively adjusted without influencing the magnetic circuit of the permanent magnet region 120. A comparison of the torque curves when w2=0.16R and w2=0.19R is illustrated in FIG. 3. When w2=0.19R, the torque curve will lose some peak points which should have been generated by the consequent-pole region 130 but now are lost due to the magnetic saturation in the consequent-pole region 130, thereby significantly decreasing the electromagnetic torque and increasing the torque fluctuation. When it is kept that w2=0.13R, the influence of the change in w2/w1 on the electromagnetic torque is illustrated in FIG. 4, and it is preferable that w2/w1=1.4 to 1.8.

In some embodiments of the present disclosure, as illustrated in FIG. 2, regarding the second stepped groove 152, an included angle between an end face adjacent to the mounting groove 110 and a side adjacent to an axis of the iron core 100 is a3, and it satisfies a3=85° to 110°. The included angle a3 influences the way in which the magnetic lines emitted from the permanent magnet 200 enter the consequent-pole region 130. As a3 increases, the flow of the magnetic lines along the side of the second air slot 150 adjacent to the rotation shaft 300 will be smoother, and no local magnetic saturation will occur, but a difference between w1 and w2 will decrease, resulting in a reduction of the magnetic lines emitted from the permanent magnet 200 and a decrease of the electromagnetic torque. As a3 decreases, the side of the second air slot 150 adjacent to the rotation shaft 300 is not smooth, which increases the local magnetic saturation and decreases the output torque. Studies have shown that within a range of a3=85° to 110°, the magnetic lines emitted from the permanent magnet 200 can flow smoothly to the consequent-pole region 130, thereby improving the output torque and decreasing the iron loss of the rotor.

In some embodiments of the present disclosure, the number of the permanent magnetic pole regions 120 and the number of the consequent-pole regions 130 are N, respectively. In two second air slots 150 in one consequent-pole region 130, a central angle formed by two end faces of the two second stepped grooves 152 away from the respective corresponding mounting grooves 110 is a1, which satisfies a1/(180°/n)=0.5 to 0.65. As an implementable way, as illustrated in FIG. 1, N=3, that is, the number of the mounting groove groups is 3, and the number of the mounting grooves 110 is 6 in total. The angle a1 ranges from 30° to 39°. When a1>39°, the second air slot 150 cannot effectively gather the magnetic lines of the consequent-pole region 130 near the center line of the consequent-pole region 130, so that the magnetic density of the air gap is small and the electromagnetic torque decreases. If the angle a1 is too small, the consequent-pole region 130 cannot provide enough area for a passage of the magnetic lines emitted from the permanent magnet 200, resulting in a magnetic saturation in the consequent-pole region 130 and a decrease of the output torque. Studies have shown that a1/(180°/n)=0.5 to 0.65, which can ensure the uniform distribution of the magnetic lines in the consequent-pole region 130, increase the output torque and reduce the iron loss of the rotor caused by the local magnetic saturation.

Further, as illustrated in FIG. 1, a central angle formed by two end faces of the two second stepped grooves 152 adjacent to corresponding mounting grooves 110 is a2, which satisfies a2/a1=1.5 to 1.9. As an implementable way, when a1 is 37.5°, the angle a2 ranges from 56.25° to 71.25°. If the angle a1 is constant, as the angle a2 increases, the smaller the width of the soft magnetic material between the second stepped groove 152 of the second air slot 150 and the side of the permanent magnet 200 facing the consequent-pole region 130 is, the greater the magnetic resistance is. In a severe case, a magnetic saturation occurs, which will cause the magnetic lines of the permanent magnet 200 to fail to reach the consequent-pole region 130, and cause a decrease of the output torque. As a1 decreases, a circumferential thickness of the second stepped groove 152 of the second air slot 150 decreases, a modulation effect of the second air slot 150 on the magnetic lines in the consequent-pole region 130 is weakened, the torque fluctuation increases, and it is impossible to form a strong magnetic density in the air gap facing the consequent-pole region 130, thereby limiting capacity to output torque.

In some embodiments of the present disclosure, the permanent magnet 200 is a rare earth permanent magnet. As illustrated in FIGS. 1 and 2, the radius of the iron core 100 is R. In two first air slots 140 in one permanent magnetic pole, a central angle formed by two end faces of two first air slots 140 away from the respective corresponding mounting grooves 110 is a4. A dimension of the first air slot 140 along the radial direction of the iron core 100 is defined as a radial width of the first air slot 140, which is w4. Each of the mounting grooves 110 has a second end adjacent to the center of the iron core 100, and a dimension pointing from the second end to the first end 111 of the mounting groove 110 is defined as a width of the mounting groove 110, which is w3. R, a4, w4 and w3 satisfy $2*(w3-w4)*0.8/(2*\pi*a4*R/360°)=1.6$ to 1.9.

When the permanent magnet 200 used is a rare earth permanent magnet, simulation results show that the working point of the permanent magnet 200 in the motor designed according to the present application is about 0.8, that is, a magnetic flux generated by the permanent magnet 200 per unit area is 0.8 Wb. Since the first air slots 140 are disposed, a total magnetic flux generated by the two permanent magnets 200 forming the V-shape is $2*(w3-w4)*0.8$, which wholly enters the air gap through a sector with a central angle of a4 formed by the first air slots 140, and a length of a circular arc between the first air slots 140 is $2*\pi*a4*R/360°$. Therefore, a magnetic flux density in the circular arc is $2*(w3-w4)*0.8/(2*\pi*a4*R/360°)$, while a saturation magnetic flux of the soft magnetic materials is generally 1.9T. In order to prevent the magnetic saturation of the soft magnetic material, a suitable magnetic flux density may be set, and it may be defined that $2*(w3-w4)*0.8/(2*\pi*a4*R/360°)=1.6$ to 1.9.

In some embodiments of the present disclosure, the permanent magnet 200 is a ferrite permanent magnet. As illustrated in FIGS. 1 and 2, a radius of the iron core 100 is R. In two first air slots 140 in one permanent magnetic pole, a central angle formed by two end faces of two first air slots 140 away from the respective corresponding mounting grooves 110 is a4. A dimension of the first air slot 140 along the radial direction of the iron core 100 is defined as a radial width of the first air slot 140, which is w4. Each of the mounting grooves 110 has a second end adjacent to the center of the iron core 100, and a dimension pointing from the second end to the first end 111 of the mounting groove 110 is defined as a width of the mounting groove 110, which is w3. R, a4, w4 and w3 satisfy $2*(w3-w4)*0.3/(2*\pi*a4*R/360°)=1.6$ to 1.9.

When the permanent magnet 200 used is a ferrite permanent magnet, simulation results show that the working point of the permanent magnet 200 in the motor designed according to the present application is about 0.3, that is, a magnetic flux generated by the permanent magnet 200 per unit area is 0.3 Wb. Since the first air slots 140 are disposed, a total magnetic flux generated by the two permanent magnets 200 forming the V-shape is $2*(w3-w4)*0.3$, which wholly enters the air gap through a sector with a central angle of a4 formed by the first air slots 140, and a length of a circular arc between the first air slots 140 is $2*\pi*a4*R/360°$. Therefore, a magnetic flux density in the circular arc is $2*(w3-w4)*0.3/(2*\pi*a4*R/360°)$, while a saturation magnetic flux of the soft magnetic materials is generally 1.9T. In order to prevent the magnetic saturation of the soft magnetic material, a suitable magnetic flux density may be set, and it may be defined that $2*(w3-w4)*0.3/(2*\pi*a4*R/360°)=1.6$ to 1.9.

In some embodiments of the present disclosure, as illustrated in FIGS. 1 and 2, a dimension of the first air slot 140 along the radial direction of the iron core 100 is defined as a radial width of the first air slot 140. The radial width of the first air slot 140 is w4, and a distance between the first air slot 140 and the mounting groove 110 is tb2, and w4 and tb2 satisfy: tb2/w4=0.3 to 0.5. As tb2 increases, a mechanical strength of the rotor increases, but the magnetic flux leakages at the ends of the permanent magnet 200 increase, and the magnetic lines that can enter the air gap decrease. As tb2 decreases, the mechanical strength of the rotor decreases and the magnetic flux leakages decrease, but the magnetic lines generated by a magnetic flux side of the permanent magnet 200 shielded by the first air slot 140 decrease. When tb2 decreases to a certain range, the electromagnetic torque decreases. As w4 increases, the area of the permanent magnet 200 shielded by the first air slot 140 increases, the magnetic lines generated by the permanent magnet 200 decrease, and the electromagnetic torque decreases. As w4 decreases, the magnetic lines generated at the end of the permanent magnet 200 adjacent to the outer periphery of the rotor will directly pass through the first air slot 140, such that the magnetic flux leakage increases and the first air slot 140 cannot effectively adjust the distribution of the magnetic lines of the permanent magnet 200 entering the air gap, which increases the torque fluctuation. Studies have shown that when tb2/t4=0.3 to 0.5, the first air slot 140 can effectively adjust the distribution of the magnetic lines of the permanent magnetic pole entering the air gap, decrease the torque fluctuation, effectively limit the magnetic flux leakages at the ends and improve the output torque.

Figure 5:
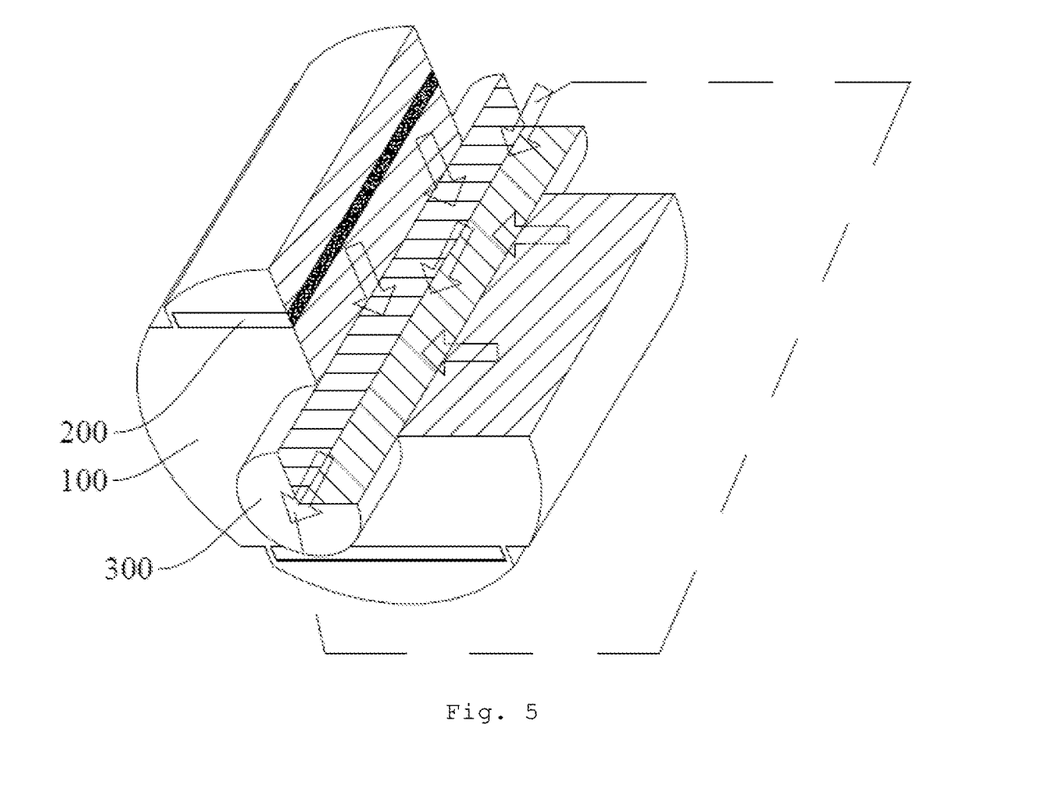
FIG. 5 is a schematic diagram of a magnetic flux leakage path in a motor rotation shaft in some embodiments of a rotor assembly of the present disclosure.

In some embodiments of the present disclosure, as illustrated in FIG. 1, the center of the iron core 100 is provided with a rotation shaft hole 160. The iron core 100 is further provided with a third air slot 170 annularly arranged on an outer edge of the rotation shaft hole 160. The third air slot 170 is a structure composed of a plurality of segments each interposed between two mounting grooves 110, and end faces of the third air slot 170 are disposed to be spaced apart from the mounting grooves 110. As illustrated in FIG. 5, a magnetic circuit is formed by a motor housing (not illustrated) and the magnetic flux leakages of the magnetic lines emitted from the permanent magnet 200 in a motor rotation shaft 300, and the presence of the third air slot 170 increases the magnetic resistance of the magnetic circuit from the magnetic lines emitted from the permanent magnet 200 to the rotation shaft 300, thereby reducing the number of magnetic lines reaching the rotation shaft 300 and improving the output torque of the motor. The third air slot 170 is not communicated with the mounting groove 110 of the permanent magnet 200, which can ensure that the rotor punched structure is a whole.

In some embodiments of the present disclosure, each of the mounting grooves 110 has a second end adjacent to the center of the iron core 100, and a dimension from the second end to the first end 111 of the mounting groove 110 is defined as a width of the mounting groove 110. A dimension of the third air slot 170 along the radial direction of the iron core 100 is defined as a radial width of the third air slot 170. As illustrated in FIG. 1, the width of the mounting groove 110 is w3, and the radial width of the third air slot 170 is t2, and w3 and t2 satisfy: t2/w3=0.1 to 0.3. As t2 increases, the greater the magnetic resistance of the third air slot 170 between the permanent magnet 200 and the motor shaft 300 is, the better the effect of reducing the magnetic flux leakage on the motor shaft 300 is. However, an area of a magnetic flux surface of the permanent magnet 200 shielded by the third air slot 170 increases, and as compared with the magnetic flux surface that is not shielded, the number of the magnetic lines generated by the shielded permanent magnet 200 decreases due to the increase of the magnetic resistance, resulting in a decrease of the output torque of the motor. As t2 decreases, the area of the permanent magnet 200 shielded by the third air slot 170 decreases, and the total number of the magnetic lines generated by the permanent magnet 200 increases, but the magnetic flux leakage in the rotation shaft 300 increases and the electromagnetic torque also decreases. Studies have shown that when t2/w3=0.1 to 0.3, reducing the magnetic flux leakage of the third air slot 170 has an effect obviously superior to reducing the magnetic lines by shielding the magnetic flux surface of the permanent magnet 200, and the motor torque is improved.

In some embodiments of the present disclosure, as illustrated in FIGS. 1 and 2, a dimension of the third air slot 170 along the radial direction of the iron core 100 is defined as a radial width of the third air slot 170, which is t2. A distance between a sidewall of the rotation shaft hole 160 and a sidewall of the third air slot 170 adjacent to the rotation shaft hole 160 is t3, which satisfies: t3≥2*t2. As t2 increases, the third air slot 170 has a better effect of reducing the magnetic flux leakage, but the mechanical strength of the rotor structure decreases due to the influence of the centrifugal force when the rotor runs, and the effect is opposite when t2 decreases. As t3 increases, the mechanical strength of the rotor and the safety factor increase, but the area of the consequent-pole area 130 between the third air slot 170 and the outer periphery of the rotor will be further compressed. If the area is too small, a magnetic density saturation of the consequent-pole area 130 will occur, which decreases the output torque, increases the iron loss of the rotor and decreases the operation efficiency. Studies have shown that when t3≥2*t2, the rotor has a good mechanical strength and the electromagnetic torque is improved.

In some embodiments of the present disclosure, as illustrated in FIGS. 1 and 2, a dimension of the third air slot 170 along the radial direction of the iron core 100 is defined as a radial width of the third air slot 170, which is t2. A distance between the end face of the third air slot 170 and the sidewall of the mounting groove 110 adjacent to the third air slot 170 is tb1, which satisfies: tb1/t2=0.3 to 1. As tb1 decreases, the magnetic density is easier to be saturated, thereby reducing the magnetic lines of the magnetic flux leakage emitted from the permanent magnet 200 to the rotation shaft 300. However, the magnetic resistance of the magnetic circuit faced by the permanent magnet 200 that is shielded by the third air slot 170 also increases, resulting in a decrease of the total number of the magnetic lines emitted from the permanent magnet 200 and a decrease of the mechanical strength. Although the magnetic flux leakage is reduced, the electromagnetic torque also decreases, and when tb1 increases, but the effect is opposite. Studies have shown that when tb1/t2=0.3 to 1, the mechanical strength of the rotor is the best, and the electromagnetic torque is improved to a certain extent.

Figure 6:
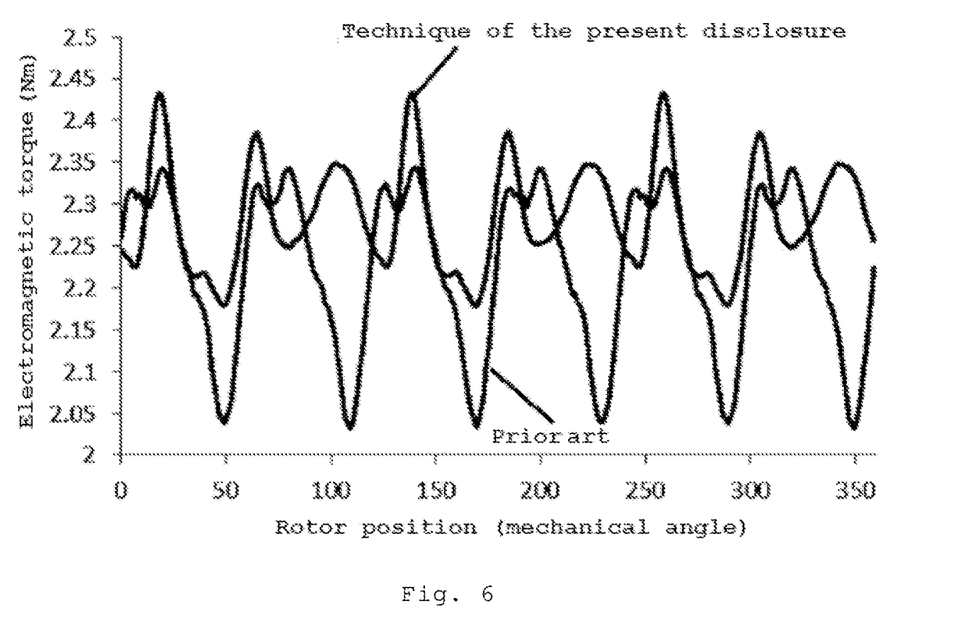
FIG. 6 is a graph illustrating an output torque comparison between some embodiments of a consequent-pole motor of the present disclosure and a motor in the prior art.

The present disclosure further provides a consequent-pole motor, including a rotor assembly 10 and a stator assembly, wherein the rotor assembly 10 is according to any one of the above solutions. The stator assembly is disposed to sleeve the outer edge of the rotor assembly 10. A comparison of a torque curve between the consequent-pole motor provided by the present disclosure and the prior art is illustrated in FIG. 6. Obviously, the consequent-pole motor provided by the present disclosure has a larger average torque and a smaller torque fluctuation.

The technical features of the above embodiments can be combined arbitrarily. In order that the description is concise, not all possible combinations of the technical features in the above embodiments are described. However, provided that there is no contradiction therebetween, those combinations should be considered to fall within the scope of the present disclosure.

Those described above are merely several embodiments of the present disclosure. Although the descriptions thereof are specific and detailed, those embodiments cannot be understood as limitations to the scope of the invention patent. It should be noted that several modifications and improvements may be made by persons of ordinary skill in the art without departing from the concept of the present disclosure, and they fall within the protection scope of the present disclosure. Therefore, the protection scope of the disclosed patent should be determined by the appended claims.

Finally, it should be noted that the above embodiments are only for a purpose of illustrating the technical solutions of the present disclosure, rather than making limitations thereto. Although the present disclosure has been described in detail with reference to the preferred embodiments, persons of ordinary skill in the art should understand that the specific embodiments of the present disclosure can still be modified or some technical features can be equivalently replaced, without departing from the spirit of the technical solutions of the present disclosure, and should fall within the protection scope of the technical solutions claimed by the present disclosure.

What is claimed is:

1. A rotor assembly, comprising:
    an iron core provided with a plurality of mounting grooves; and
    a plurality of permanent magnets accommodated respectively in the plurality of mounting grooves,
    wherein the plurality of mounting grooves are distributed along a circumferential direction of the iron core, and divide the iron core into a plurality of permanent magnetic pole regions and a plurality of consequent-pole regions, each mounting groove of the mounting grooves has a first end adjacent to an outer edge of the iron core; one side of the first end is provided with a second air slot located in the consequent-pole regions;

the second air slot is communicated with the mounting groove, and magnetic poles of the plurality of permanent magnets facing the outer edge of the iron core are the same;

a center of the iron core is provided with a rotation shaft hole; the iron core is further provided with a third air slot annularly arranged on an outer edge of the rotation shaft hole; the third air slot is a structure composed of a plurality of segments, each segment of the third air slot is interposed between two of the mounting grooves, and an end face of the third air slot is disposed to be spaced apart from the mounting grooves.

2. The rotor assembly according to claim 1, wherein the other side of the first end is provided with a first air slot located in the permanent magnetic pole regions, and the first air slot is disposed to be spaced apart from the mounting groove.

3. The rotor assembly according to claim 2, wherein a circumferential width dimension of the first air slot gradually increases along a radially outward direction of the iron core.

4. The rotor assembly according to claim 3, wherein the permanent magnet is a rare earth permanent magnet; a radius of the iron core is R; in two first air slots in one of the permanent magnetic poles, a central angle formed by two end faces of two of the first air slots away from respective corresponding mounting grooves is a4; a dimension of the first air slot along a radial direction of the iron core is defined as a radial width of the first air slot, which is w4; each mounting groove of the mounting grooves has a second end adjacent to a center of the iron core, and a dimension pointing from the second end to the first end of the mounting groove is defined as a width of the mounting groove, which is w3; and R, a4, w4 and w3 satisfy: $2*(w3-w4)*0.8/(2*\pi*a4*R/360°)=1.6$ to $1.9$.

5. The rotor assembly according to claim 3, wherein the permanent magnet is a ferrite permanent magnet; a radius of the iron core is R; in two first air slots in one of the permanent magnetic poles, a central angle formed by two end faces of the two first air slots away from respective corresponding mounting grooves is a4; a dimension of the first air slot along a radial direction of the iron core is defined as a radial width of the first air slot, which is w4; each mounting groove of the mounting grooves has a second end adjacent to a center of the iron core, and a dimension pointing from the second end to the first end of the mounting groove is defined as a width of the mounting groove, which is w3; and R, a4, w4 and w3 satisfy: $2*(w3-w4)*0.3/(2*n*a4*R/360°)=1.6$ to $1.9$.

6. The rotor assembly according to claim 2, wherein every two of the mounting grooves form a mounting groove group which is V-shaped, with an opening thereof facing the outer edge of the iron core, and two mounting grooves in each of the mounting groove groups are disposed symmetrically with respect to a radial direction of the iron core; the plurality of mounting groove groups are uniformly distributed along the circumferential direction of the iron core; a region within a V-shaped included angle of the mounting groove group is a permanent magnetic pole region, and a region between the adjacent mounting groove groups is a consequent-pole region.

7. The rotor assembly according to claim 6, wherein the permanent magnetic pole region is provided with two first air slots which are adjacent to first ends of the two the mounting grooves in the mounting groove group, respectively, and which are symmetrical with respect to a center line of a V-shape of the mounting groove group; and two second air slots respectively corresponding to the first ends of the two mounting grooves in the mounting groove group are symmetrical with respect to the center line of the V-shape of the mounting groove group.

8. The rotor assembly according to claim 2, wherein a dimension of the first air slot along a radial direction of the iron core is defined as a radial width of the first air slot; a radial width of the first air slot is w4, and a distance between the first air slot and the mounting groove is tb2, and w4 and tb2 satisfy: $tb2/w4=0.3$ to $0.5$.

9. The rotor assembly according to claim 1, wherein the second air slot is extended along the circumferential direction of the iron core, and one side of the second air slot adjacent to an axis of the iron core is stepped; a dimension of the second air slot along a radial direction of the iron core is defined as a radial width of the second air slot, the second air slot sequentially comprises a first stepped groove and a second stepped groove along a direction away from the first end, and a radial width of the first stepped groove is less than a radial width of the second stepped groove.

10. The rotor assembly according to claim 9, wherein a radius of the iron core is R, the radial width of the first stepped groove is w1, and the radial width of the second stepped groove is w2; the radius R of the iron core, the radial width w1 of the first stepped groove and the radial width w2 of the second stepped groove satisfy: $w2<0.17R$, and $w2/w1=1.4$ to $1.8$.

11. The rotor assembly according to claim 9, wherein the plurality of the permanent magnetic pole regions and the plurality of the consequent-pole regions are distributed at intervals along the circumferential direction of the iron core; central angles respectively corresponding to the plurality of permanent magnetic pole regions are equal to each other, and central angles respectively corresponding to the plurality of consequent-pole regions are equal to each other.

12. The rotor assembly according to claim 11, wherein the number of the permanent magnetic pole regions and the number of the consequent-pole regions are N; in two second air slots in one of the consequent-pole regions, a central angle formed by two end faces of two second stepped grooves away from respective corresponding mounting grooves is a1, which satisfies: $a1/(180°/N)=0.5$ to $0.65$.

13. The rotor assembly according to claim 11, wherein in two second air slots in one of the consequent-pole regions, a central angle formed by two end faces of two second stepped grooves away from respective corresponding mounting grooves is a1, and a central angle formed by two end faces of the two second stepped grooves adjacent to respective corresponding mounting grooves is a2, and a1 and a2 satisfy: $a2/a1=1.5$ to $1.9$.

14. The rotor assembly according to claim 9, wherein an included angle between an end face of the second stepped groove adjacent to the mounting groove and a side adjacent to an axis of the iron core is a3, which satisfies: $a3=85°$ to $110°$.

15. The rotor assembly according to claim 1, wherein each mounting groove of the mounting grooves has a second end adjacent to the center of the iron core, and a dimension pointing from the second end to the first end of the mounting groove is defined as a width of the mounting groove; a dimension of the third air slot along a radial direction of the iron core is defined as a radial width of the third air slot; the width of the mounting groove is w3, the radial width of the third air slot is t2, and w3 and t2 satisfy: $t2/w3=0.1$ to $0.3$.

16. The rotor assembly according to claim 1, wherein a dimension of the third air slot along a radial direction of the iron core is defined as a radial width of the third air slot, which is t2; a distance between a sidewall of the rotation shaft hole and a sidewall of the third air slot adjacent to the rotation shaft hole is t3, and t2 and t3 satisfy: $t3 \geq 2*t2$.

17. The rotor assembly according to claim 1, wherein a dimension of the third air slot along a radial direction of the iron core is defined as a radial width of the third air slot, which is t2; a distance between an end face of the third air slot and a side wall of the mounting groove adjacent to the third air slot is tb1, and t2 and tb1 satisfy: $tb1/t2 = 0.3$ to $1$.

18. A consequent-pole motor, comprising a rotor assembly according to claim 1, and a stator assembly disposed to sleeve an outer edge of the rotor assembly.

* * * * *

UNITED STATES PATENT AND TRADEMARK OFFICE
CERTIFICATE OF CORRECTION

PATENT NO. : 11,855,489 B2
APPLICATION NO. : 17/055881
DATED : December 26, 2023
INVENTOR(S) : Bin Chen et al.

It is certified that error appears in the above-identified patent and that said Letters Patent is hereby corrected as shown below:

In the Claims

Column 13, Line 35, Claim 4, delete "360°"" and insert -- 360°) --

Column 13, Line 49, Claim 5, delete "360°"" and insert -- 360°) --

Signed and Sealed this
Thirteenth Day of February, 2024

Katherine Kelly Vidal
*Director of the United States Patent and Trademark Office*